(No Model.) 2 Sheets—Sheet 1.
R. GALBRAITH.
OVEN FOR COOKING STOVES OR RANGES.
No. 416,160. Patented Dec. 3, 1889.
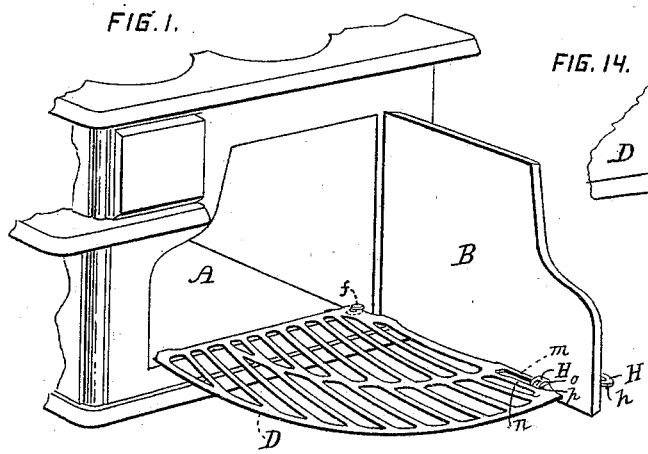
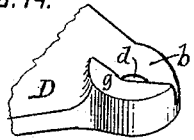
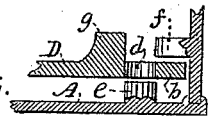
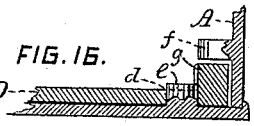
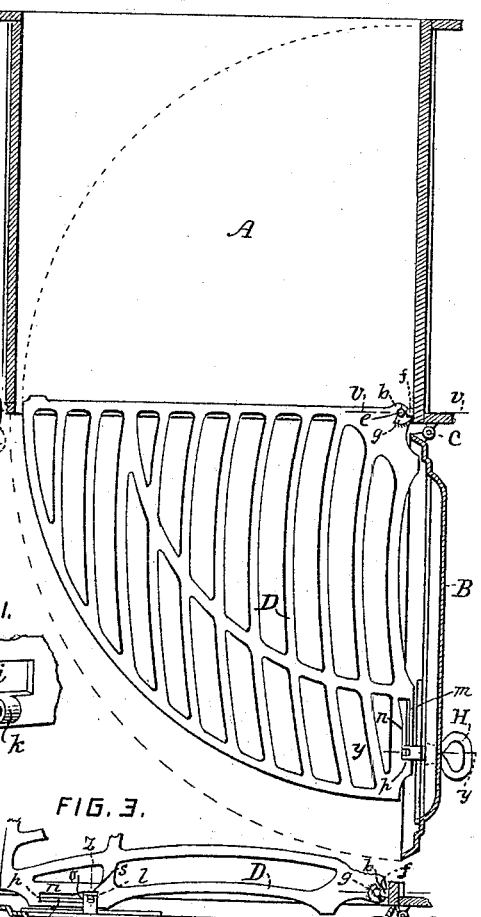
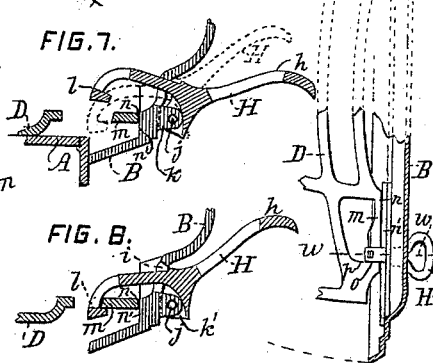
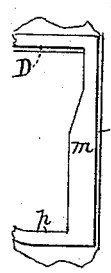
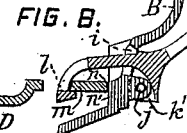
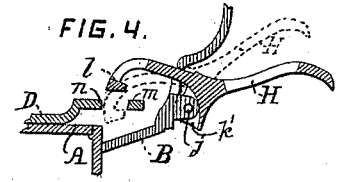
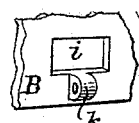
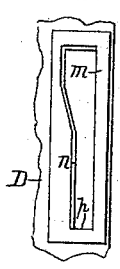
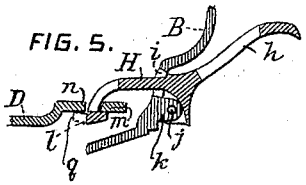
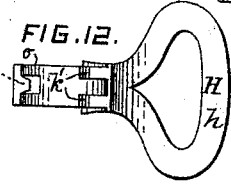
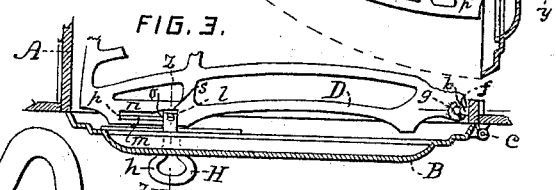
WITNESSES.
Chas H Benedict
Jas L Parker
INVENTOR.
Robt Galbraith (No Model.) 2 Sheets—Sheet 2.
R. GALBRAITH.
OVEN FOR COOKING STOVES OR RANGES.
No. 416,160. Patented Dec. 3, 1889.
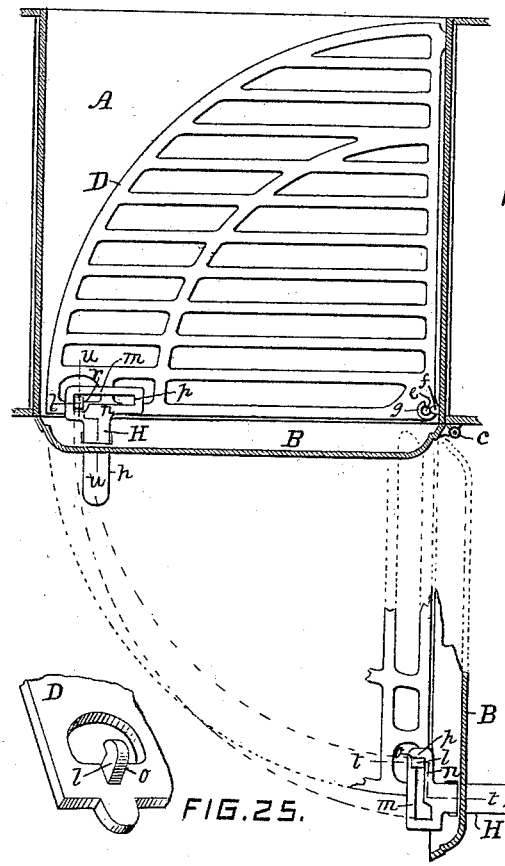
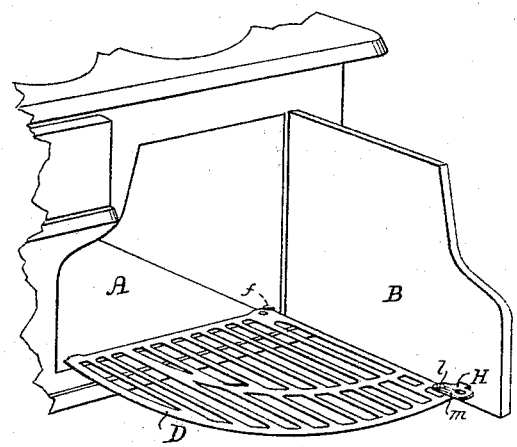
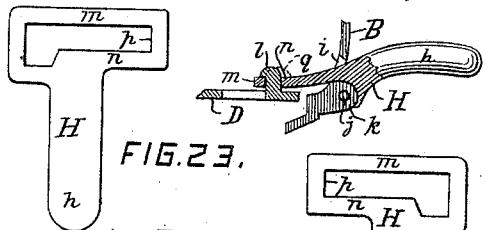
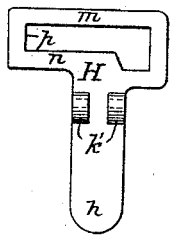
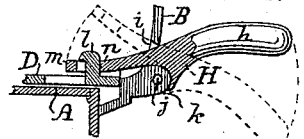
WITNESSES.
Chas H Benedict
Jesse L Parker
INVENTOR.
Robt Galbraith

UNITED STATES PATENT OFFICE.

ROBERT GALBRAITH, OF LANSINGBURG, ASSIGNOR TO SHERMAN S. JEWETT & CO., OF BUFFALO, NEW YORK.

OVEN OF COOKING STOVES OR RANGES.

SPECIFICATION forming part of Letters Patent No. 416,160, dated December 3, 1889.

Application filed March 22, 1887. Serial No. 231,907. (No model.)

*To all whom it may concern:*

Be it known that I, ROBERT GALBRAITH, a citizen of the United States, residing in the village of Lansingburg, in the county of Rensselaer and State of New York, have invented certain new and useful Improvements in Ovens for Cooking Stoves or Ranges, of which the following is a specification, reference being had to the accompanying drawings.

This invention relates, principally, to an oven furnished with a segmental pan-rest or slide mounted to be turned to and fro or slid out and in in an arc of a circle or a curved course, and with a door hinged to swing laterally in a curved course eccentric to that of the movement of the slide, and having a hand-latch extending through and mounted on the door and adapted to be engaged with and detached from the slide upon moving the latch, so that the door can be opened either with or without simultaneously drawing out the slide and supporting its drawn-out side by the latch on the door.

Heretofore some stove-ovens have had such a segmental slide, swinging door, and hand-latch thereon, all so constructed that while the slide was drawn out and supported at its drawn-out side by the latch the latch could then be freely detached from the slide, so as to leave the drawn-out side of the slide without support from the latch, by accidentally or otherwise moving the latch out of its position for drawing out the slide. I avoid that defect by my invention, of which the general objects are, first, to so construct and mount the slide, door, and latch that when the slide is drawn out by the latch on the door the latch will be automatically so locked to the slide that the latch cannot be detached from the slide while the door is much open, and that the latch will be free to be detached from the slide or will be automatically detached therefrom when the door is closed; second, to so construct and mount the slide, door, and latch that when the slide is drawn out and locked to the door by the latch the further opening of the door and drawing out of the slide will be automatically stopped by the latch when the slide is drawn out and the door opened to a predetermined extent, and, third, to provide very simple and effective devices for accomplishing the aforesaid objects. These objects are attained by the mechanism represented in the accompanying drawings, in which—

Figure 1 is a perspective view of a stove-oven having one form of my invention applied thereto, with the slide drawn out and its drawn-out side supported and locked to the opened door by a latch on the door. Fig. 2 is a plan and partial horizontal section of the same. Fig. 3 shows in plan and horizontal section parts of the same oven, door, and latch when the door is closed, and Fig. 4 represents, on a larger scale, a vertical section of parts of the same at about the line $z\,z$ in Fig. 3, with the latch disengaged from the slide. Fig. 5 is an enlarged vertical section of the parts at the line $y\,y$ in Fig. 2. Fig. 6 represents, in plan and partial horizontal section, portions of the same oven, door, latch, and slide, somewhat modified, when the door is closed, and by broken lines when the door is open and the slide is drawn out and supported and locked to the door by the latch. Fig. 7 is an enlarged vertical section of parts of the same at the line $x\,x$ in Fig. 6, and Fig. 8 is an enlarged vertical section of the parts at the line $w\,w$ in the same figure. Fig. 9 is an enlarged plan of a part of the oven-slide shown in Figs. 1, 2, and 3; and Fig. 10 is a like plan of a part of the oven-slide represented in Fig. 6. Fig. 11 is an enlarged view of the part of the door to which is applied the latch shown in Figs. 1, 2, 3, 4, 5, 6, 7, and 8, and of which latch a plan of its under side is represented in Fig. 12. Fig. 13 is a view of the parts of the oven by which the corresponding perforated part of the slide shown in Fig. 14 is secured to the oven in Figs. 1, 2, 3, 6, 17, and 18. Fig. 15 is a sectional elevation of the same parts when the slide is being introduced into the oven, and Fig. 16 is a sectional elevation of the same parts at the line $v\,v$ in Fig. 2 when the slide is drawn out. Fig. 17 is a perspective view of an oven furnished with a segmental pan-rest or slide and a door having a latch for engagement with and disengagement from the slide according to another form of this invention. Fig. 18 is a plan and partial section of the same, showing the door closed, and also by broken lines when open and the slide drawn out. Fig. 19 is a vertical section of parts of the same at the line $u\ u$ in Fig. 18, with the latch depressed, ready to engage with the slide, as shown in Fig. 20, in beginning to open the door. Fig. 21 is an elevation and partial section of the same at the lines $t\ t$ in Fig. 18. Fig. 22 is a view of the part of the door on which is mounted the latch, of which a plan of its upper side is shown in Fig. 23, and of its lower side in Fig. 24. Fig. 25 is a view of the part of the slide with which the latch is shown engaged in Figs. 17, 18, 20, and 21.

A represents the stove-oven; B, its door hinged at $c$, so as to swing laterally to and fro in a curved course or arc of a circle, and D is a segmental slide mounted in the oven so as to turn to and fro laterally in a curved course, or in an arc of a circle eccentric to that of the movement of the door. The slide can be thus mounted in the oven by the means heretofore employed for that purpose in some stove-ovens, or by means of any suitable known pivoting, hinging, jointing, or guiding device. I commonly have for this purpose a pivot-stud $e$, Figs. 13, 15, and 16, fast on the oven-bottom at a short distance from the axis of movement of the door and below a lug $f$ on the wall of the oven, and have the oven-slide formed with a perforation or socket $d$, adapted to fit upon the stud $e$, as in Fig. 16, and with an adjacent raised part $g$, Figs. 14, 15, and 16, which will permit the slide to be freely placed in the oven with its low part $b$ under the lug $f$, as in Fig. 15, and its socket $d$ first over and then down upon the stud $e$, and which raised part $g$ will be turned directly under the lug $f$, as in Figs. 2 and 16, when the slide is drawn out and will then prevent the disengagement of the slide from the pivot-stud.

H is a hand-latch, which extends through and is mounted on the door and has a projecting part or handle $h$ outside of the door, and is adapted to be freely engaged with and disengaged from the slide D by moving the latch by its outside handle when the door is closed. The door B, slide D, and latch H are so constructed, arranged, and mounted in respect to each other that when the door is closed the latch will be detached from the slide when the handle of the latch is depressed, so that the door can then be opened without drawing out the slide. When the door is closed, the handle of the latch is elevated and then pulled outward, as in thereby opening the door, the latch will engage with and draw out the slide as the door is opened, and will then serve to support the drawn-out side of the slide. While the slide is being thus drawn out by the latch, the latch has progressive movement with the door along the slide in consequence of the eccentric movements of the door and slide in respect to each other, and by its progressive movement along the slide the latch will be so automatically locked to the slide that the latch cannot be detached from the slide while the latter is far drawn out. When the slide is drawn out to a predetermined extent, a stop on the latch meets a stop on the slide and thereby prevents the further opening of the door and drawing out of the slide. In closing the door the latch will have a reverse progressive movement along the slide, so as to automatically unlock the latch from the slide. I commonly have the handle of the latch so heavy that the handle will drop by gravity and thereby automatically remove the latch from the slide whenever the door is closed and the handle of the latch is left free. The latch is shown extending through and mainly closing a suitable opening $i$ through the door, and is mounted on the door by a pivot-pin $j$ and corresponding perforated lugs $k$ and $k'$ on the latch and door, so that the latch will move up and down a limited distance in a plane crossing the plane of the door.

In carrying out the primary parts of my invention the latch can be mounted on the door by other suitable known means and to move in a plane or course not crossing the plane of the door, the same as the latches heretofore mounted on the doors and used for drawing out the slides of stove-ovens at will.

In Figs. 1, 2, 3, 4, 5, 6, 7, and 8 the latch H has at its inner end a catch $l$, which, when the door is closed and the handle of the latch is suitably raised, passes down freely in rear of the bar or way $m$ on the slide, as shown at $s$ in Figs. 3 and 6, and by dotted lines in Figs. 4 and 7. By then pulling the door open by the raised handle the latch draws out the slide and the catch $l$ passes under the part $m$, and thereby supports the drawn-out side of the slide. As the latch moves along the slide in drawing it out, the catch $l$ of the latch passes along under the way $m$ and between that way and the way $n$, as shown in Figs. 2 and 5, or, as shown in Figs. 6 and 8, forces the way $n$ of the slide closely against a way or bearing $n'$ on the door, so that in each case the slide is thereby so automatically locked to the door by the latch that the latch cannot be detached from the slide and will support the drawn-out side of the slide, while the door remains far open.

When the door is opened and the slide is drawn out by the latch on the door to a suitable predetermined extent, as shown in Figs. 1, 2, and 6, a part, as $o$, on the latch meets a stop $p$ on the slide, and thereby prevents the further opening of the door and drawing out of the slide.

In the modification represented by Figs. 17, 18, 19, 20, 21, 23, 24, and 25 the catch $l$ is on the slide and the ways $m$ and $n$ are on the latch. When the oven-door is closed and the handle $h$ of the latch is suitably raised, the catch $l$ will extend up in front of the way $m$, as shown at $r$ in Fig. 18, and by full lines in Fig. 19. By then pulling the door open by the raised handle the slide will be drawn out by the latch, of which the way $m$ will be under the catch $l$ and will support the drawn-out side of the slide. As the slide is drawn out by the latch the shank of the catch $l$ passes closely between the ways $m$ and $n$, as shown by Figs. 18 and 21, and thereby so locks the latch to the slide that the latch cannot be accidentally or otherwise detached from the slide while the slide is far out of the oven. When the slide is drawn out to a pre-determined extent by the latch, the further drawing out of the slide is arrested by the stop $p$ on the latch meeting the part $o$ on the slide, as shown in Fig. 18.

In carrying out this invention by the means represented in Figs. 2, 3, 4, and 5, or 18, 19, 20, and 21, the catch $l$ may extend laterally in the reverse direction, as indicated by dotted lines at $q$ in Fig. 5 or 21, so as to support the drawn-out side of the slide by the way $n$ instead of by the way $m$.

I claim as my invention—

1. The combination, with an oven and its door hinged to turn laterally, of a slide on the oven-bottom and pivoted eccentrically in relation to the hinge of the door, and a latch on the door, said latch and slide being formed one with a catch having an approximately upright shank and horizontal end projection and the other with ways at essentially the same distance apart throughout the main portion of their lengths and at a different distance apart at one end part of the ways, substantially as set forth, whereby the latch will be automatically locked to the slide and prevented from being disengaged therefrom upon drawing out the slide by the latch.

2. The combination, with an oven, its hinged door, and the pivot-stud fast on the oven-bottom, of the oven-slide having a socket fitting on said pivot-stud, the high part at one side of said socket and the low part at the opposite side thereof, a latch on the door to engage with and draw out the slide, and on the oven-wall the lug adjacent to said pivot-stud, and having its under side above the top of that stud a distance greater than the depth of said low part of the slide and less than the depth of said high part thereof, substantially as set forth.

In testimony whereof I hereunto set my hand, in the presence of two subscribing witnesses, this 18th day of March, 1887.

ROBT. GALBRAITH.

Witnesses:
   CHAS. H. BENEDICT,
   JESSE L. PARKER.